US011215167B2

(12) United States Patent
Girolamo (10) Patent No.: US 11,215,167 B2
(45) Date of Patent: Jan. 4, 2022

(54) SPAR CAP, WIND TURBINE BLADE, METHOD FOR FABRICATION OF A SPAR CAP, AND METHOD FOR FABRICATION OF A WIND TURBINE BLADE (71) Applicant: Siemens Gamesa Renewable Energy A/S, Brande (DK)

(72) Inventor: Donato Girolamo, Molinara (IT)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 393 days.

(21) Appl. No.: 16/244,206

(22) Filed: Jan. 10, 2019

(65) Prior Publication Data
US 2019/0211806 A1 Jul. 11, 2019

(30) Foreign Application Priority Data

Jan. 11, 2018 (EP) .................................... 18151221

(51) Int. Cl.
F03D 80/30 (2016.01)
F03D 1/06 (2006.01)
B29D 99/00 (2010.01)
B29K 307/04 (2006.01)

(52) U.S. Cl.
CPC ......... F03D 80/30 (2016.05); B29D 99/0025 (2013.01); F03D 1/0675 (2013.01); B29K 2307/04 (2013.01); F05B 2230/60 (2013.01); F05B 2280/6003 (2013.01)

(58) Field of Classification Search
None
See application file for complete search history.

(56) References Cited

U.S. PATENT DOCUMENTS

2007/0074892 A1 4/2007 Hibbard
2008/0073098 A1 3/2008 Llorente Gonzalez et al.
2008/0145229 A1 6/2008 Llorente Gonzalez et al.
2012/0134826 A1* 5/2012 Arocena De La Rua ...................
F03D 80/30
416/146 R
2014/0341738 A1* 11/2014 Bech ....................... F03D 80/30
416/146 R (Continued)

FOREIGN PATENT DOCUMENTS

CN 101080570 A 11/2007
CN 205895489 U 1/2017
EP 2930355 A1 10/2015

OTHER PUBLICATIONS

European Search Report dated Jul. 16, 2018 for Application No. 18151221.1.

(Continued)

Primary Examiner — Kayla McCaffrey
(74) Attorney, Agent, or Firm — Schmeiser, Olsen & Watts, LLP (57) ABSTRACT Provided is a spar cap for a wind turbine blade, including a main body, which includes an electrically conductive portion, and at least one metal conductor, wherein the metal conductor includes a terminal portion and at least one connection portion, wherein the connection portion of the metal conductor is wrapped by a first end of an electrically conductive and stripe-shaped carbon fibre mat, which abuts with a second end at least partly on the electrically conductive portion of the main body.

15 Claims, 4 Drawing Sheets (56) References Cited

U.S. PATENT DOCUMENTS

2015/0292479 A1\* 10/2015 Ohlerich ............... B29C 70/882
                                                    416/226
2016/0327028 A1\* 11/2016 March Nomen ....... F03D 80/30
2017/0080648 A1    3/2017 Tobin et al.
2018/0156202 A1\*  6/2018 Lipka ...................... F03D 80/30
2018/0180031 A1\*  6/2018 Klein ..................... F03D 80/30
2019/0001592 A1\*  1/2019 Nielsen ................ B29C 70/547
2019/0195203 A1\*  6/2019 Fujioka ................ F03D 1/0675

OTHER PUBLICATIONS

Office Action in corresponding Chinese Patent Application No. 201910027638.7 dated Apr. 20, 2020. 6 pages.

\* cited by examiner

SPAR CAP, WIND TURBINE BLADE, METHOD FOR FABRICATION OF A SPAR CAP, AND METHOD FOR FABRICATION OF A WIND TURBINE BLADE

CROSS-REFERENCE TO RELATED APPLICATION

This application claims priority to European Application No. 18151221.1, having a filing date of Jan. 11, 2018 the entire contents of which are hereby incorporated by reference.

FILED OF TECHNOLOGY

The following relates to a spar cap for a wind turbine blade, comprising a main body, which comprises an electrically conductive portion, and at least one metal conductor, wherein the metal conductor comprises a terminal portion and at least one connection portion. Furthermore, the following relates to a wind turbine, a method for fabrication of a spar cap, and a method for fabrication of a wind turbine blade.

BACKGROUND

Dimensions of wind turbines and their rotor blades are exponentially increasing. The increasing sizes of the rotor blades or wind turbine blades require special designs for the wind turbine blades to maintain and to ensure their mechanical stability and integrity during operation of the wind turbine. Materials suitable for the design of large turbine blades are for instance fibre-based compound materials like fibre reinforced plastic due to their large stiffness to weight ratio. An important component for the mechanical stability and integrity of a wind turbine blade is the so called spar cap, which can be tailored to transfer the main aerodynamic flapwise bending loads from the wind turbine blades. Only a portion of the load is transferred to the foundations. The major part of the flatwise load is transferred, as torque, via the hub to the generator to produce electricity. The spar caps are usually designed using unidirectional fibre reinforced plastics.

The usage of carbon fibre reinforced plastics bears the challenge, compared to glass fibre reinforced plastic, that the carbon fibres are electrically conductive and can interact with the lightning protection system of the wind turbine when the wind blade intercepts a lightning strike. To avoid damage to the structure, a proper integration of carbon fibre reinforced plastic based parts to the lightning protection system of the wind turbine is required as otherwise direct lightning and/or flashovers from the main down conductor can cause damage and/or failing of the wind turbine blade.

EP 2 930 355 A1 describes a rotor blade of a wind turbine, in which an electrical conductive part, which contains carbon fibres, is connected to a conductor of a lightning protection system by using copper meshes to connect the electrical conductive part with the conductor to establish a potential equalization.

US 2015/0292479 A1 discloses a spar cap assembly for a wind turbine rotor blade, which is reinforced with carbon fibres and comprises a lightning conductor, which is connected to the spar cap by using at least one potential equalizing element. To establish an electrical connection, a portion of the potential equalizing element lies against a first layer of the carbon fibres of the spar cap and is covered over by a second layer of carbon fibres of the spar cap, wherein the second layer reaches up to the lightning conductor. The electrically conductive top layer of carbon fibres improves the electrical contact between a spar cap and the lightning conductor.

These techniques are vulnerable to malfunctioning connections between the metal conductor, the spar cap and a conductor of the lightning protection system, since the number of connections is usually kept at a minimum to facilitate the manufacturability of the wind turbine blade. A single malfunctioning connection may result as a consequence in an inadequate potential equalization and flashovers as well as possible catastrophic failure of the wind turbine blade. Additionally, the implementation of the electrical connections allows only small tolerances during the fabrication of the blade. Small tolerances are difficult to achieve in particular for larger structures and are in case of failures difficult to detect and expensive to repair.

SUMMARY

An aspect relates to a spar cap for a wind turbine blade, which provides a reliable potential equalization between conductive parts of the spar cap and a lightning protection system as well as which facilitates the fabrication of the spar cap and the entire wind turbine blade.

According to embodiments of the invention, another aspect relates to a spar cap as initially described, wherein the connection portion of the metal conductor is wrapped by a first end of an electrically conductive and stripe-shaped carbon fibre mat, which abuts with a second end at least partly on the electrically conductive portion of the main body.

Embodiments of the invention have the advantage that a very good and reliable electrical contact between the metal conductor and the electrically conductive portion of the main body of the spar cap is achieved by wrapping the electrically conductive and stripe-shaped carbon fibre mat around the metal conductor. Also, the carbon fibre mat can abut on the electrical conductive portion in a large area, so that the contact resistance and therefore the entire resistance between the metal conductor and the electrically conductive portion are decreased. Furthermore, due to the integration of the metal conductor, both a fabrication of the spar cap and a fabrication of a wind turbine blade comprising at least one spar cap according to the invention is facilitated, since an integration of the metal conductor of the spar cap into the lightning protection system of the wind turbine blade allows comparably large tolerances. This facilitates especially the fabrication of larger wind turbine blades as it tolerates larger manufacturing and positioning errors by using a pre-casted spar cap for the fabrication of a wind turbine blade.

The spar cap can comprise one or more metal conductors, wherein each metal conductor is connected to the electrically conductive portion by the means of a wrapped stripe-shaped carbon fibre mat. A stripe-shape carbon fibre mat may connect more than one metal conductor to the electrically conductive portion by being wrapped with its first end around more than one connection portion of the metal conductors. It is also possible, that a metal conductor comprises more than one connection portion, wherein each connection portion is connected to the electrically conductive portion of the main body by a stripe-shaped carbon fibre mat to create redundancy in the electrical connections. In particular, it is possible that the electrically conductive portion of the wing blade comprises carbon fibre-based materials to enable a high mechanical stability of the spar cap and therefore also for a wind turbine blade comprising at least one of the spar caps.

Due to the facilitated integration of the spar cap according to the invention into an entire wind turbine blade, it is possible to use a pre-casted or pre-fabricated spar cap for the fabrication of the wind turbine blade. This allows advantageously a pre-qualification of the pre-casted spar cap prior to its introduction in the wind turbine blade both by structural and electrical testing. Structural testing may occur for instance as a non-destructive examination like ultrasonic testing to identify structural defects in the component before assembling and enabling facilitated and cost effective repairs. Electrical testing, such as thermography ultrasonic scanning and electrical resistance measurements enable for instance the testing of the connection between the metal conductor and the electrically conductive portion. Faulty electrical connections can be identified and repaired prior to the integration of the spar cap in the wind turbine blade.

It is possible that the spar cap comprises a plurality of metal conductors to achieve a redundancy in the electrical connections between the spar cap and the lightning protection system to allow a proper functionality also in case that some of the connections are damaged. This improves the reliability of the integration of the electrical conductive portion of the spar cap to the lightning protection system of the wind turbine blade and therefore causes also an improvement of the reliability of a wind turbine comprising a wind turbine blade with spar caps according to the invention.

In a preferred embodiment of the invention, it may be provided that the metal conductor, which is in particular a braided cable or a metal stripe, comprises a rectangular or substantially rectangular or oval or substantially oval cross-section, wherein the entire cross-section of the connection portion is wrapped at least with one layer of the carbon fibre mat. The metal conductor can be for instance a braided cable or a solid stripe made of an electrically conductive metal like aluminium, copper, steel, or titanium. The stripe-shaped carbon fibre mat is wrapped around the entire cross-section of the metal conductor at least one time, which means that the metal conductor is wrapped at least by one layer of the carbon fibre mat. This leads to a significant reduction of the contact resistance between the metal conductor and the carbon fibre mat and therefore also to a reduced contact resistance between the metal conductor and the electrically conductive portion of the spar cap. The electrically conductive and stripe-shaped carbon fibre mat can be for instance a (dry) mat comprising unidirectional carbon fibres. Alternatively, also a carbon fibre mat comprising strands or rovings of fibres arranged in more than one direction like biaxial carbon fibres or triaxial carbon fibres can be used.

Embodiments of the invention may provide that the main body comprises a top side and a bottom side, wherein at least the top side is covered partly or entirely by at least one cover mat, in particular a cover mat consisting of a glass fibre-based material or a carbon fibre-based material or aramid-based material, wherein the second end of the carbon fibre mat is sandwiched between the electrically conductive portion of the main body and the cover mat. It is possible that the top side or the top side and the bottom side are covered by more than one layer of cover mats and/or by a plurality of cover mats, which are arranged side by side on the top side or the bottom side, respectively. The usage of the cover mat or the cover mats improves the transversal strength and the stiffness of the spar cap and increases its resistance against damage due to impact and/or during handling. As carbon fibre-based material for the cover mat, for instance a unidirectional carbon fibre mat or a biaxial carbon fibre mat or a triaxial carbon fibre mat can be used. Additionally or alternatively, also cover mats comprising glass fibres and/or aramid or aramid fibres can be used.

Preferably, the conductive portion of the main body consists of a carbon fibre-based compound material comprising at least one unidirectional carbon fibre layer, wherein the carbon fibres of the unidirectional carbon fibre layer are oriented along a length axis of the spar cap. The main body of the spar cap can have for instance a stripe-shaped form, wherein the length axis of the spar cap corresponds to the length axis of the wind turbine blade in a mounted state of the spar cap. The length direction of the wind turbine blade can also be understood as the radial direction of a wind turbine rotor comprising a plurality of wind turbine blades. By orienting the unidirectional carbon fibres of the electrical conductive portion of the main body along the length axis of the spar cap and therefore also along the length axis of the wind turbine blade in a mounted state of the spar cap, the stiffness and strength of the wind turbine blade during operation of the wind turbine is improved.

Since the second end of the carbon fibre mat abuts the electrically conductive portion of the main body or the carbon fibre-based compound material, respectively, a transfer of charges between the electrical conductive part of the main body or the carbon fibre-based compound material, respectively, and the carbon fibre mat as well as the metal conductor is enabled. By connecting the metal conductor to a lightning protection system of a wind turbine and/or a wind turbine blade, a potential equalization of the electrically conductive portion is enabled.

Additionally, it may be provided that the carbon fibre-based compound material comprises several unidirectional carbon fibre layers and one or more layers of a biaxial carbon fibre material, wherein the unidirectional carbon fibre layers and the biaxial carbon fibre layer or the biaxial carbon fibre layers are alternately stacked. The alternated stacking of the unidirectional fibre layers and the biaxial carbon fibre layers increases the mechanical integrity and strength along multiple axis of the electrically conductive portion of the main body and therefore of the entire spar cap or of the wind turbine blade, respectively. By using carbon fibres for the unidirectional fibre layers as well as for the biaxial fibre layers, also the electrical conductivity of the electrically conductive portion of the main body is maintained.

In a preferred embodiment of the invention, it may be provided that the main body comprises at least one core wedge, in particular a core-wedge consisting of balsa wood and/or plywood and/or a foamed polymer material, with a rectangular cross-section or trapezoid cross-section or polygonal cross-section abutting the conductive portion of the spar cap. The shape of the cross-section of the core-wedge can be adapted to the shape and/or the thickness of a panel, which abuts the spar cap during and after the fabrication of the wind turbine blade. Preferably, the main body of the spar cap comprises two core-wedges attached or arranged to the sides of the stripe-shaped electrically conductive portion of the main body. The core-wedges can be attached to the electrical conductive portion of the main body for instance by gluing.

In particular, it is possible that an attachment of the core-wedges to the electrically conductive portion of the main body occurs alternatively or additionally by the usage of the cover mat or the cover mats, which cover the entire topside and/or the entire topside and the bottom side of the main body, so that the core-wedges are attached to the electrically conductive portion of the main body of the spar cap by the cover mat. The usage of material like balsa wood, plywood, and/or foamed polymer for the core-wedges allows absorbing of larger positioning tolerances during the assembly of the wind turbine blade. This facilitates the integration of a pre-casted spar cap into the fabrication process for the entire wind turbine blade.

A wind turbine blade according to the invention comprises at least one spar cap according to the invention. In particular, it is possible that the wind turbine blade comprises two spar caps or two arrangements of spar caps aligned end-to-end to each other.

Additionally, it may be provided that the wind turbine blade comprises at least one down conductor, which is connected to the terminal portion of each of the one or more metal conductors of the at least one spar cap by at least one connection element, which is in particular oriented chord-wise and/or oriented perpendicular to the terminal portion and/or U-shaped. The connection element can consist of a metal like aluminium, copper, steel and/or titanium. By using a U-shaped connection element, it is possible that a side of the U-shaped connection element is attached to the terminal portion of a first metal conductor, where the other two sides of the U-shaped connection elements are attached to the terminal portion of a second metal conductor and to the down conductor, respectively. The connection element can be oriented chord-wise in the wind turbine blade and/or perpendicular to the terminal portion of the metal conductor, which facilitates the integration of the spar cap or the spar caps by allowing relatively large tolerances in the orientation and/or in the positioning of the spar caps and the down conductor. The connection element can be fixed for instance to the terminal portion or terminal portions and/or to the down conductor by welding or by the usage of bolts and/or clamps.

Embodiments of the invention may provide that the down conductor is arranged on a web structure of the wind turbine blade, wherein the web structure is arranged in an internal cavity of the wind turbine blade, wherein the terminal portions of the one or more metal conductors of the at least one spar cap are extending into the inner cavity. It is possible that the wind turbine blade is not solid and has therefore an inner cavity, in which a web structure to maintaining the mechanical stability and integrity of the wind turbine blade is arranged. The down conductor can be arranged on this web structure, preferably in the middle of the web structure, so that a connection of the down conductor to the terminal portions of the metal conductors of one or more spar caps, which are arranged perpendicular to the web structure, is facilitated. The web structure can be for instance a spline or strut, which extends substantially through the entire inner cavity of the wind turbine blade.

Additionally, it may be provided that an inner shell of the wind turbine blade is arranged between the at least one spar cap and the web structure, wherein the inner shell comprises one or more openings, through which each a terminal portion of the one or more metal conductors extends into the internal cavity. An inner shell can be used for instance when the wind turbine blade is produced in one piece as an integral blade. As the internal shell is arranged between the at least one spar cap and the web structure, the openings in the inner shell enable that the terminal portions of the metal conductors can extend into the inner cavity and therefore a connection between the terminal portions and the down conductor, which is arranged on the web structure and therefore also in the inner cavity, can be established. The shape of the openings can be adapted to the shape and/or the cross-section of the metal conductors. For instance, it is possible that circular openings or slot-like openings are used.

A method for fabrication of a spar cap for a wind turbine blade according to the invention comprises the following steps:
providing an electrically conductive portion of a main body of the spar cap made of one or more carbon fibre-based layers, at least one core wedge of the spar cap main body comprising a rectangular cross-section or a trapezoidal cross-section or a polygonal cross-section, and at least one metal conductor,
arranging the at least one core wedge, so that it abuts the electrically conductive portion of the main body forming the spar cap main body,
wrapping a first end of an electrically conductive and stripe-shaped carbon fibre mat around a connection portion of the metal conductor,
arranging of the metal conductor and the carbon fibre mat, so that a second end of the carbon fibre mat abuts at least partly on the electrically conductive portion of the main body.

The fibre-based materials can be casted to a solid spar cap for instance by the usage of resin injection moulding of the fibre layers. It is both possible that the entire arrangement is casted in a single resin injection moulding step or that the electrically conductive portion of the main body is casted in one or more separate resin injection moulding steps prior to the casting of the entire spar cap.

In a preferred embodiment of the invention, it may be provided that a metal conductor is used, which is in particular a braided cable or a metal stripe, and which comprises a rectangular or substantially rectangular cross-section, wherein the entire cross-section of the connection portion is wrapped at least by one layer of the carbon fibre mat. The metal conductor can consist for instance of aluminium, copper, steel and/or titanium. It is in particular possible that the carbon fibre mat is wrapped more than one time around the cross-section of the metal conductor to improve the electrical contact between the metal conductor and the carbon fibre mat. It is also possible, that more than one metal conductor is connected to the electrically conductive portion using one or more stripe-shaped carbon fibre mats. An attachment of the carbon mat to the electrically conductive portion of the main body as well as an attachment of the metal conductor to the spar cap can be established for instance by the vacuum assisted resin injection moulding, which solidifies the fibre structure of both the carbon fibre mat and the electrically conductive portion of the main body. For solidifying the fibre based structures, also the metal conductor is attached to the spar cap. The resin injection moulding can be performed in such a manner that the terminal portion of the metal conductor is not covered by the resin to facilitate the electrical connection when integrating the spar cap into the wind turbine blade afterwards.

Embodiments of the method fabricating a spar cap according to the invention may provide that one or more cover mats consisting of a glass fibre-based material or a carbon fibre-based material or an aramid-based material are used for covering a top side of the spar cap main body or the top side and the bottom side of the spar cap main body, wherein the second end of the carbon fibre based mat is sandwiched between the electrically conductive portion of the main body and the at least one cover mat. It is possible that the cover mats are also used to attach the at least one core-wedge to the electrically conductive portion of the main body. Also fixation of the second end of the carbon fibre mat to the electrically conductive portion of the main body can be achieved by using the cover mats, since the second end of the carbon fibre mat is sandwiched between the cover mat and the electrically conductive portion of the main body. A solidification of the cover mats can occur for instance by resin injection moulding.

Preferably, an electrically conductive portion of the main body is used, which consists of a carbon fibre-based compound material comprising at least one unidirectional carbon fibre layer, wherein the carbon fibres of the unidirectional carbon fibre layer are oriented along a length axis of the spar cap. The usage of unidirectional fibres oriented along the length axis of the spar cap leads to an increased mechanical stability, stiffness and/or strength especially by large spar caps provided for a usage in the fabrication of large wind turbine blades.

A method for fabrication of a wind turbine blade according to the invention comprises the following steps:
 providing at least one spar cap according to the invention or a spar cap fabricated by a method according to the invention,
 arrangement of one or more panels of the wind turbine blade, so that the panel or the panels abut each at least one spar cap,
 arrangement of a web structure, which supports a down conductor of the wind turbine blade, and/or an inner shell of the wind turbine blade and/or an outer shell of the wind turbine blade,
 connecting a terminal portion of each of the one or more metal conductors to the down conductor by at least one connection element, which is in particular oriented chord-wise and/or oriented perpendicular to the terminal portion and/or U-shaped.

The fabrication of a wind turbine blade using a pre-casted spar cab according to the invention or using a spar cap fabricated by a method for fabrication of a spar cap according to the invention facilitates significantly the fabrication of large wind turbine blades, since a testing of the properties of the pre-casted spar cap is possible prior to its integration into a wind turbine blade. Furthermore, this enhances the resin injection moulding of large composite wind turbine blades by limiting the amount of casting errors like dry areas or wrinkles and facilitates also the assembly for the arrangement of the pre-casted components in the mould of the wind turbine blade. The usage of the metal conductors exhibiting the terminal portions according to the invention allows larger manufacturing and positioning errors of the pre-casted spar cap since the integration of the spar cap into the entire wind turbine blade is facilitated, especially with regard to the electrical connection between the terminal portions and a down conductor of the wind turbine blade.

In an advantageous manner, a cost effective manufacturing of large wind turbine blades comprising carbon fibre-based composite materials is enabled by the method for fabrication of a wind turbine blade according to the invention. The usage of pre-casted spar caps for the fabrication of wind turbine blades increases also the flexibility in the supply chain and reduces the manufacturing time of the wind turbine blade. The possibility for pre-testing of the pre-casted components prior to its integration in the wind turbine blade reduces considerably the risks of manufacturing errors in the electrical connections. If an error in the spar cap is discovered during testing, the spar cap itself can be repaired prior to its integration into the entire wind turbine blade.

The one or more panels of the wind turbine blade can be arranged preferably in such a manner that the panel or the panels abut each at least one core wedge of the at least one spar cap. The geometry of the cross-section of the core-wedges can be adapted to the shape and/or the thickness of the panels to facilitate the arrangement and the casting of the wind turbine blade.

An inner shell arranged between the web structure and the spar cap can comprise several openings, to each of which a terminal portion of a metal conductor of a spar cap can be arranged, so that the electrical connections of the terminal portion to a down conductor on the web structure by the connection elements is possible. The connection elements can be for instance U-shaped. They can be arranged in particular to be oriented perpendicular to the terminal portion and/or chord-wise with respect to the wind turbine blade. The connection elements and/or the down conductor can consist for instance of aluminium, copper, steel, and/or titanium. The connection elements can be attached to the terminal portions and/or the down conductor for example by the usage of clamps and/or screws or by welding.

The arrangement of the components of the wind turbine blade can be done for instance in a mould for the blade prior to a resin injection moulding for solidifying the entire blade. It is possible that the wind turbine blade comprises several spar caps, which are arranged end-to-end to each other and/or which are arranged on both sides of the web structure.

BRIEF DESCRIPTION

Some of the embodiments will be described in detail, with reference to the following figures, wherein like designations denote like members, wherein.

DETAILED DESCRIPTION

Figures 1, 2:
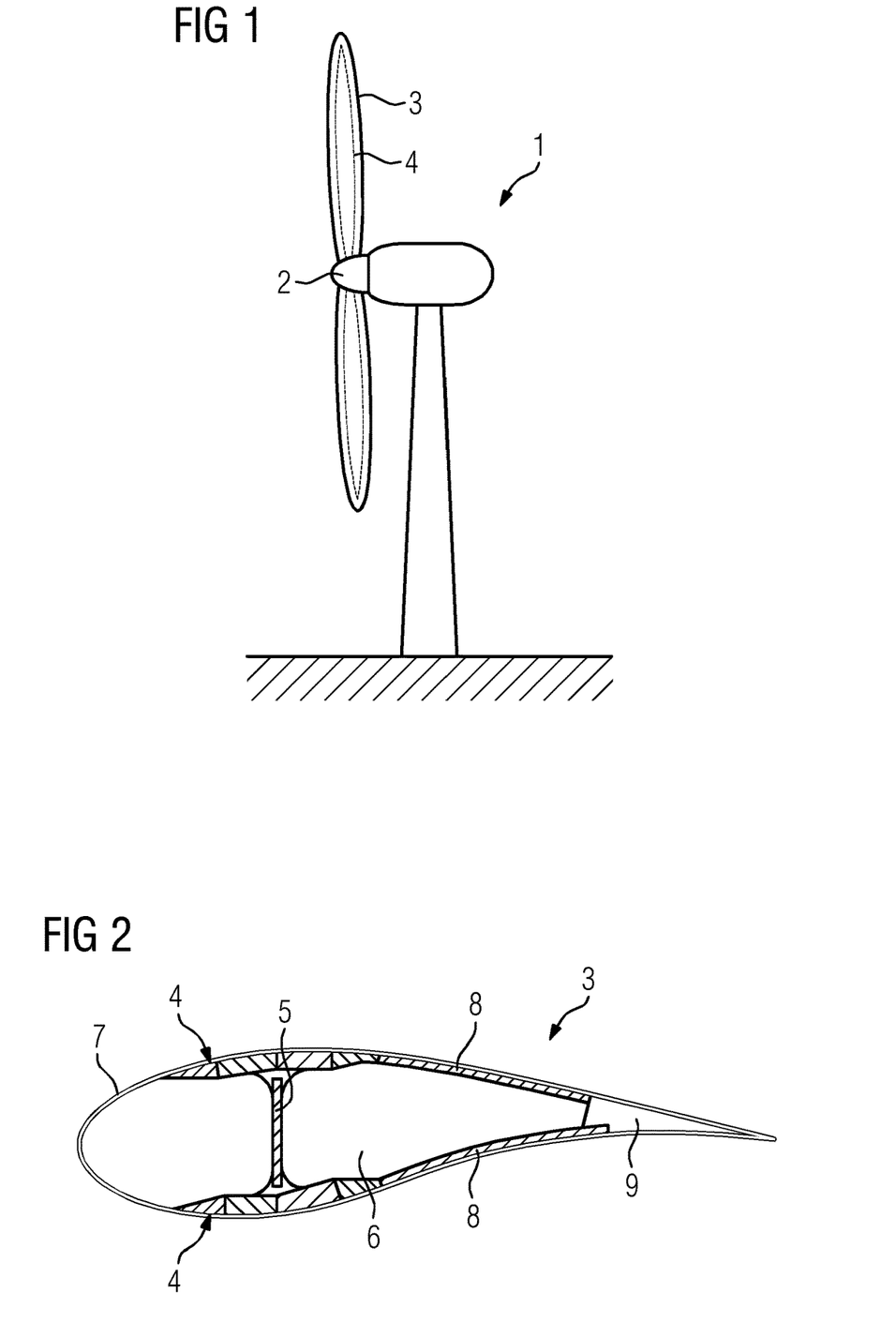
FIG. 1 a schematic view of a wind turbine.
FIG. 2 a cross-section of a wind turbine blade according to embodiments of the present invention.

In FIG. 1, a schematic view of a wind turbine 1 is shown. The wind turbine 1 comprises a hub 2 with a rotor comprising a plurality of wind turbine blades 3 attached to the hub 2. Each wind turbine blade 3 comprises at least one spar cap 4, wherein the position of the spar cap 4 in or at the wind turbine rotor blade 3 is shown by the dashed lines. The spar caps 4 are used to increase the mechanical stability of the wind turbine blades 3 during the operation of the wind turbine 1, in particular in along the length axis of the spar cap 4 or the length axis of the wind turbine blades 3, respectively.

In FIG. 2, a cross-section through a wind turbine blade 3 is shown. The wind turbine blade 3 comprises two spar caps 4, which are arranged substantially perpendicular to a web structure 5 arranged in an inner cavity 6 of the wind turbine blade 3. The wind turbine blade 3 comprises also a panel 7, which forms a leading edge of the wind turbine blade 3 as well as two panels 8, which are arranged between one of the spar caps 4 and a trailing edge 9 of the wind turbine blade 3. The spar caps 4 are tailored to transfer the main aerodynamic flapwise bending loads from the wind turbine blades 3 to the turbine hub 2 and ultimately to a foundation of the wind turbine 1.

Figure 3:
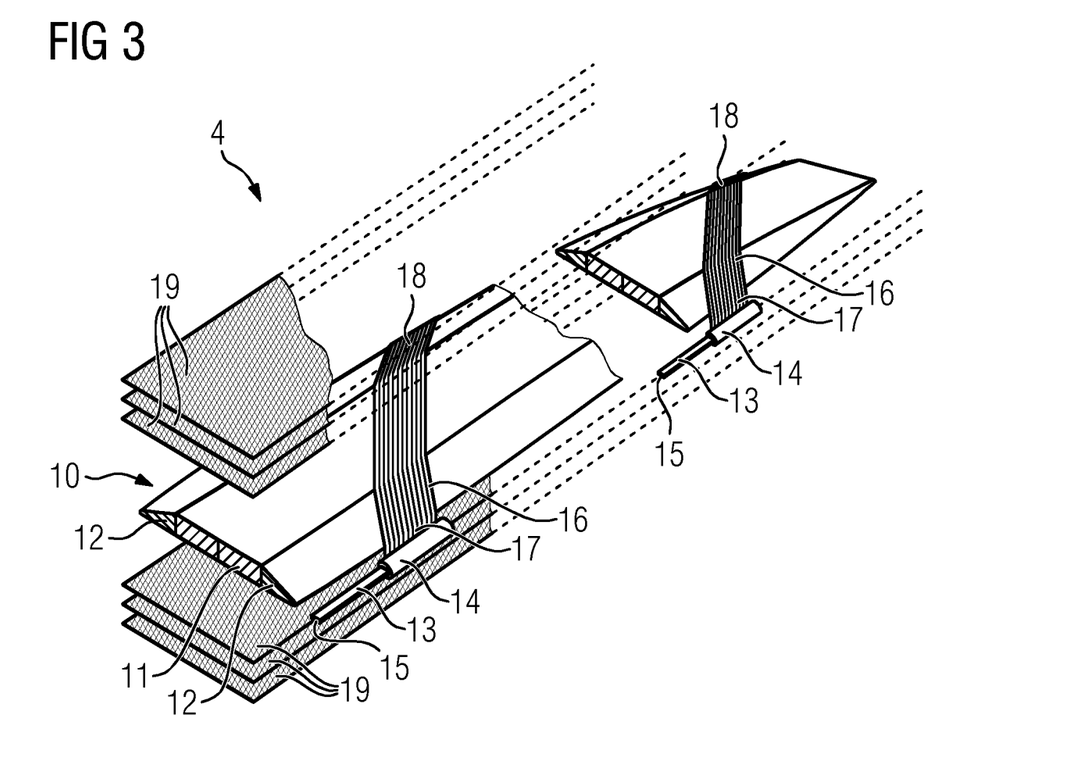
FIG. 3 an exploded view of a spar cap according to embodiments of the present invention.

FIG. 3 shows an explosive view of a spar cap 4 according to the invention. The spar cap 4 comprises a main body 10 which consists of an electrically conductive portion 11 and two core-wedges 12. Additionally, the spar cap 4 comprises several metal conductors 13, which each comprises a connection portion 14 and a terminal portion 15. An electrically conductive and stripe-shaped carbon fibre mat 16 is wrapped with one end 17 around the connection portion 14 of the metal conductor 13. A second end 18 of each carbon fibre mat 16 abuts the electrical conductive portion 11 of the spar cap main body 10.

The spar cap 4 comprises additionally several layers of cover mats 19 which are arranged both on a top side and on a bottom side of the spar cap main body 10. To facilitate the view on the components of the spar cap 4, the cover mats 19 are shown in an explosive view. The cover mats 19, which are arranged in direct contact with the electrically conductive portion 11 and the core-wedges 12 of the main body 10 of the spar cap 4, can be used to attach these components together and to ensure the stability of the spar cap 4. During fabrication of the spar cap 4 as well as in the casted spar cap 4, the second ends 18 of the carbon fibre mats 16 are sandwiched between the main body 10 of the spar cap 4 and the cover mats 19.

The electrically conductive and stripe-shaped carbon fibre mat 16 creates an electrically conductive connection between the electrically conductive portion 11 of the main body 10 and the metal conductors 13. By wrapping the carbon fibre mats 16 around the connection portions 14 of the metal conductors 13, the contact resistance between the respective metal conductor 13 and the carbon fibre mat 16 is reduced, so that only a small resistance and therefore a good electrical conductivity between the electrically conductive portion 11 and the metal conductor 13 is achieved.

In a method for fabrication of a spar cap for a wind turbine blade according to the invention, the electrically conductive portion 11 of the main body 10 of the spar cap 4 made of one or more carbon fibre-based layers may be arranged with the core wedges 12 of the spar cap 4 main body 10, so that the core wedges 12 abut the electrically conductive portion 11.

A first end 17 of the electrically conductive and stripe-shaped carbon fibre mat 16 may be wrapped around the connection portion 14 of the metal conductor 13, wherein the metal conductor 13 and the carbon fibre mat 16 are arranged in a manner that the second end 18 of the carbon fibre mat 16 abuts at least partly on the electrically conductive portion 11. Of course, more than one metal conductors 13 and carbon fibre mats 16 can be provided and arranged in this manner. Subsequently, both the main body 10 and the second end 18 of the carbon fibre mat 16 may be covered by using one or more layers of cover mats 18 consisting of a glass fibre-based material or a carbon fibre-based material or an aramid-based material. The cover mats 16 can be arranged in particular on both a top side and a bottom side of the spar cap 4. A solidifying of the spar cap 4 can occur in a resin injection moulding steps subsequently to the arrangement of the components of the spar cap 4.

Figure 4:
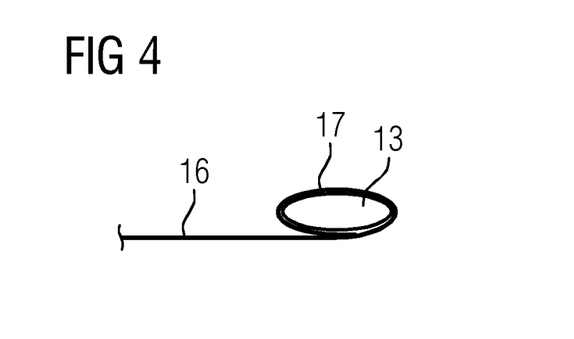
FIG. 4 a detailed view on a metal conductor of a spar cap according to embodiments of the present invention.

FIG. 4 shows a detailed view of a metal conductor 13 wrapped by the first end 17 of a carbon fibre mat 16. The metal conductor 13 may comprise a rectangular or oval cross-section or a substantially rectangular or substantially oval cross-section, for instance a rectangular cross-section with round corners. The metal conductor can be a braided cable or stripe-conductor made of aluminium, copper, steel, titanium or another electrically conductive metal. Due to the wrapping by the first end 17 of the carbon fibre mat 16 around the cross-section of the connection portion 14 of the metal conductor 13, a contact resistance between the carbon fibre mat 16 and the metal conductor 13 may be decreased. In particular, it is possible that the first end 17 of the carbon fibre mat 16 wraps the cross-section of the connection portion 14 of the metal conductor 13 with more than one layer. The terminal portion 15 and the connection portion 14 of the metal conductor 13 may have the same shape of cross-sections of differently shaped cross-sections.

Figure 5:
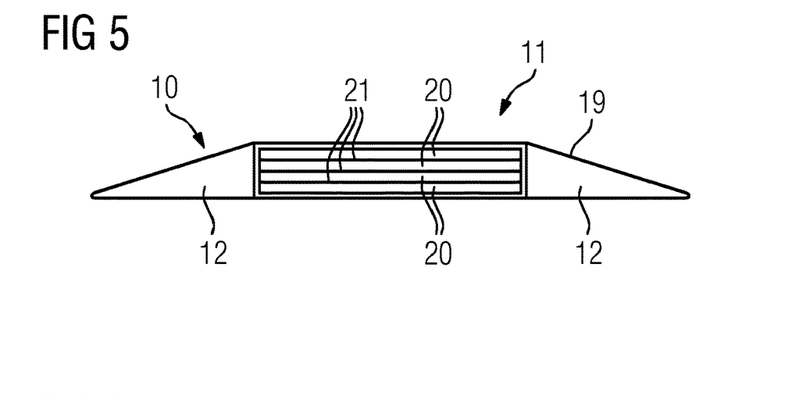
FIG. 5 a cross-sectional view of a main body of a spar cap according to embodiments of the present invention.

In FIG. 5, a cross-section of the main body 10 of a spar cap 4 according to the invention is shown. The main body 10 comprises two core-wedges 12 as well as an electrically conductive portion 11. Both the core-wedges 12 and the electrically conductive portion 11 are covered both on the top side and on the bottom side of the main body 10 by a cover mat 19. It is possible to use more than one layer of cover mats 19 to cover both top side and the bottom side of the main body 10.

The depicted core-wedges 12 have a triangular cross-section and consist of relatively soft material like balsa-wood, plywood and/or a foamed polymer material. It is also possible that the core-wedges 12 have a trapezoid or a polygonal cross-section. The shape of the cross-section of the core-wedges 12 can be adapted to the size and/or the diameter of panels, which are arranged abutting the core-wedges, or the carbon mats covering the core-wedges, respectively. The cover mats 19 can consist of a glass fibre-based material or a carbon fibre-based material or an aramid-based material. By applying the cover mats 19 to the main body 10, the core-wedges 12 can be attached to the electrically conductive portion 11.

The electrically conductive portion 11 consists in this embodiment of four stacks of unidirectional carbon fibres 20 and/or pultruded planks with rectangular shape of unidirectional carbon fibres 20 and three layers of biaxial carbon fibres 21, which are stacked in an alternating order. The alternate stacking of biaxial carbon fibre based-material comprising strands or rovings of fibres arranged in more than one angle as well as unidirectional carbon fibre based-material increases the mechanical stability of both the main body 10 and the entire spar cap 4. The main body 10 may also exhibit a curvature or a convex or concave top side or bottom side, respectively.

Figure 6:
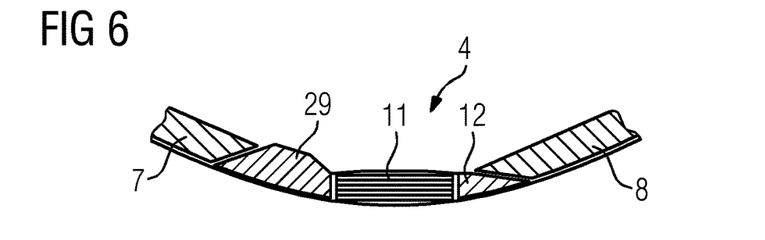
FIG. 6 a schematic side view of an intermediate step of a method for fabrication of a wind turbine blade according to embodiments of the present invention.

In FIG. 6, the arrangement of the panel 7 and the panel 8 to spar cap 4 is shown. The panels 7 and 8 are arranged to the spar cap, so that the panel 8 abuts the core-wedge 12, which exhibits a triangular cross-section, and the panel 7 abuts the core-wedge 29, which exhibits a polygonal cross-section. The shape of the cross-section of the core-wedges 12, 29 are adapted to both the curvature of the spar cap 4 as well as to the thickness and the shape of the panels 7, 8, respectively.

Figure 7:
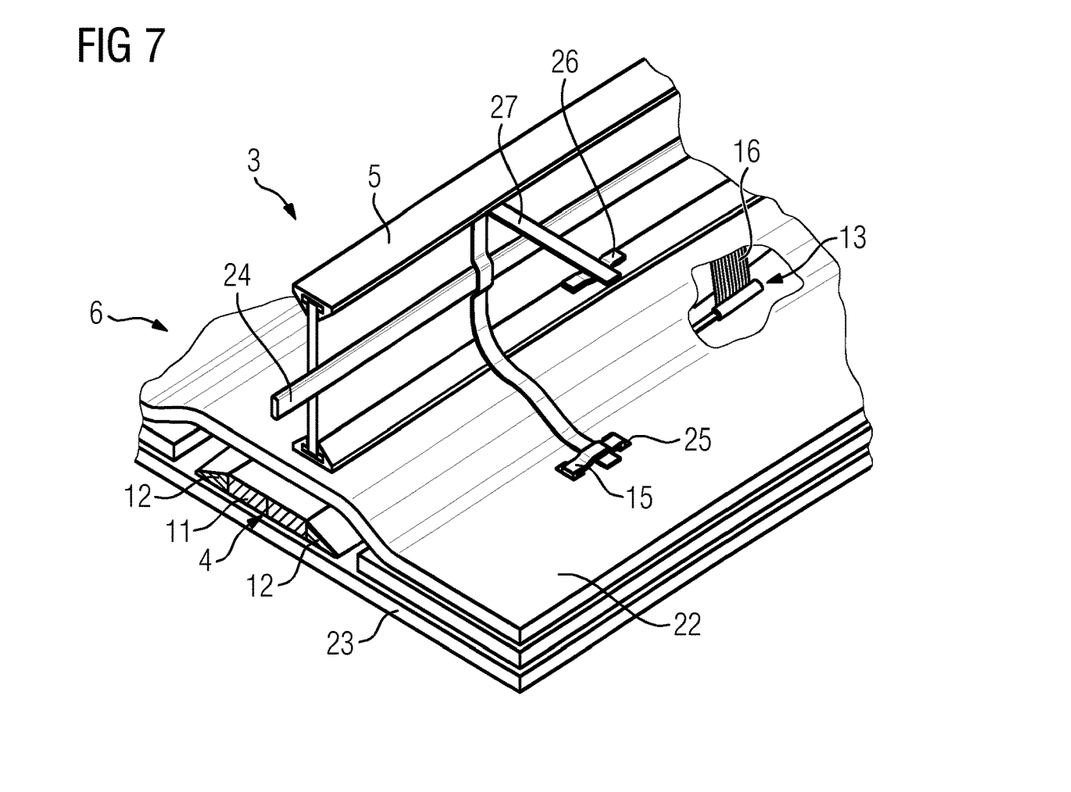
FIG. 7 a schematic view of an intermediate step of a method for fabrication of a wind turbine blade according to embodiments of the present invention.

FIG. 7 depicts an explosive view of a wind turbine blade 3 according to the invention in a detailed view. The wind turbine blade comprises a spar cap 4, wherein the spar cap 4 comprises an electrically conductive portion 11 as well as two core-wedges 12. Furthermore, the wind turbine blade comprises an inner shell 22 and an outer shell 23. The inner shell 22 is arranged between the web structure 5 and the spar cap 4. In the middle of the web structure 5, a down conductor 24 is arranged. The down conductor 24 can be for instance a metallic conductor consisting of aluminium, copper, steel, titanium or another electrically conductive metal.

The inner shell 22 comprises an opening 25 or a plurality of openings 25, wherein through each opening 25, a terminal portion 15 of a metal conductor 13 is arranged, so that it extends in the inner cavity 6 of the wind turbine blade 3. The connection portion 14 of the metal conductor 13 is connected to the electrically conductive portion 11 of the spare cap 4 by the carbon fibre mat 16. As previously shown in FIG. 2, a second spar cap can be aligned on the top of the web structure 5 or on top of the inner shell 22, which may be arranged also between the top of the web structure 5 and the additional spar cap. A terminal portion 26 of the additional spar cap is shown schematically as part of the additional spar cap.

A connection of one or more terminal portions 15, 26 of one or more metal conductors 13 to the down conductor 24 is achieved by the usage of the connection element 27, which is arranged perpendicular to the terminal portions 15, 26 and exhibits a U-shape. The connection element 27 is also aligned chord-wise within the inner cavity 6 of the wind turbine blade 3. The connection element 27 can consist for instance of aluminium, copper, steel, titanium or another electrically conductive metal. The connection element 27 can be attached to the down conductor 24 as well as to the terminal portions 15, 26 by welding or by the usage of bolts, screws or clamps. Due to the length of the terminal portions 15, 26 as well as due to the shape of the connection element 27, relatively large tolerances in the arrangement of the components of the wind turbine blade 3 are possible. It shall be understood that each spar cap 4 can have more than one metal conductor 13 with more than one terminal portion, wherein each terminal portion is connected to the down conductor 24 by at least one connection element 27 throughout the entire length of the blade 3. By the connection of the terminal portions 15 of the metal elements 13 of the spar cap 4, a potential equalization of the electrical potential between the electrically conductive portion 11 of the spar cap 4 as well as the down conductor 24 is achieved. The down conductor 24 can be for instance part of a lightning protection system of the wind turbine blade 3 or the wind turbine 1, respectively.

In a method for fabrication of a wind turbine blade 3, at least one pre-casted spar cap 4 may be provided and arranged together with of one or more panels 7, 8 of the wind turbine blade inside a blade mould, so that the panels 7, 8 abut each at least one core wedge 12 of the at least one spar cab 4.

Also the web structure 5, which supports the down conductor 24 of the wind turbine blade 3, as well as the inner shell 22 of the wind turbine blade 3 and the outer shell 23 of the wind turbine blade 3 may be arranged in the blade mould. Prior or after a solidification, for instance by resin injection moulding, of the components of the wind turbine blade 3, the terminal portions 15, 26 extending through the openings 25 of the inner shell 22 towards the down conductor 24 of all metal conductors 13 may be connected to the down conductor 24 by at least one connection element 27. The connection elements 27 can be in particular oriented chord-wise and/or oriented perpendicular to the terminal portion. Also, the connection elements 27 can be U-shaped.

Figure 8:
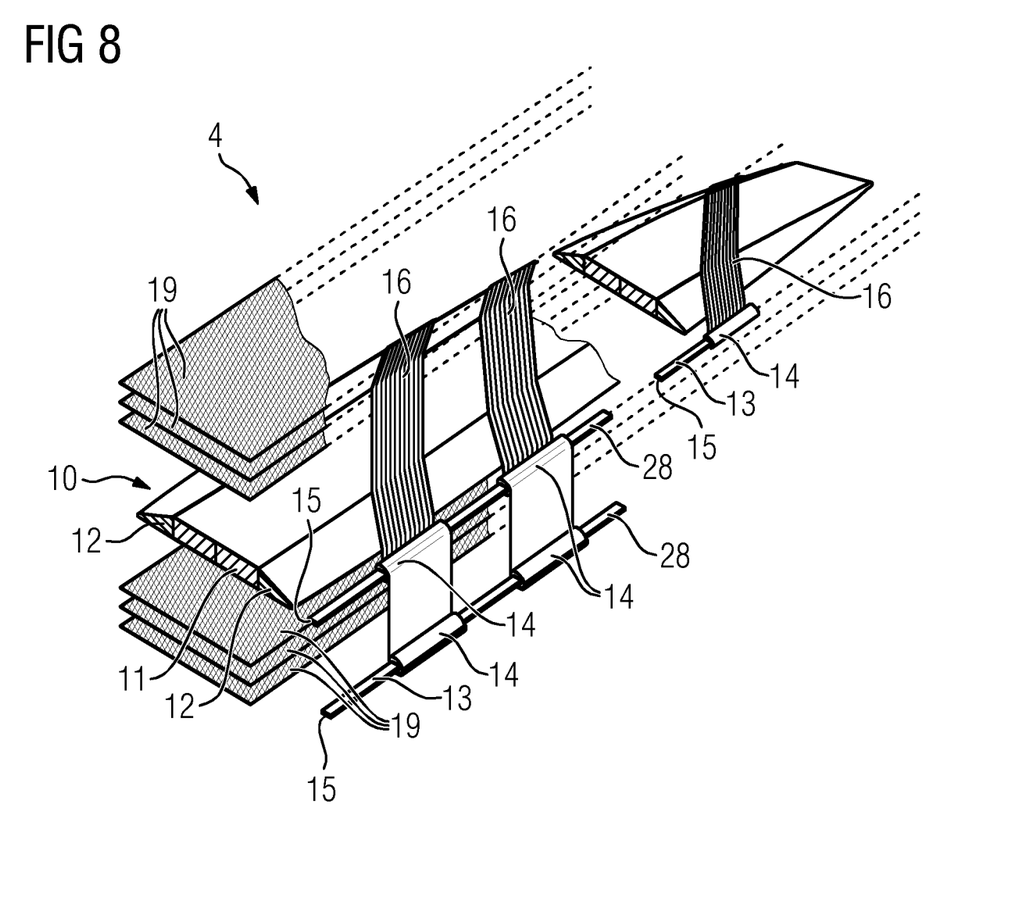
FIG. 8 an exploded view of a second embodiment of a spar cap according to embodiments of the present invention.

In FIG. 8, a second embodiment of a spar cap according to the invention is shown. Components corresponding to the components of the previous shown embodiment in FIG. 3 are labelled with the same reference numerals. The spar cap 4 shown in FIG. 8 comprises two metal conductors 28, which exhibits each two connection portions 14. Furthermore, both a connection portions 14 of each metal connector 28 is wrapped by the first end 17 of a carbon fibre mat 16. In this way, redundant electrical connections between the metal conductor 28 and the carbon fibre mat 16 as well as the electrically conductive portion 11 are created to increase the robustness of the connection. It is also possible, that each connection portion 14 is connected by a separate carbon fibre mat 16 to the electrically conductive portion 11. In particular, each terminal portion 15 of the metal conductor 28 can be connected to a down conductor 24 of the wind turbine blade using one or more connection elements 27.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A spar cap for a wind turbine blade, comprising:
   a main body comprising an electrically conductive portion and at least one metal conductor, wherein the at least one metal conductor comprises a terminal portion and at least one connection portion; and
   an electrically conductive and stripe-shaped carbon fibre mat having a first end and a second end, the first end wrapping around the at least one connection portion of the at least one metal conductor, and the second end abutting at least partly on the electrically conductive portion of the main body.

2. The spar cap according to claim 1, wherein the metal conductor, which is a braided cable or a metal stripe, comprises a rectangular or oval or substantially rectangular or substantially oval cross-section, wherein an entire cross-section of the at least one connection portion is wrapped at least by one layer of the carbon fibre mat.

3. The spar cap according to claim 1, wherein the main body comprises a top side and a bottom side, further wherein at least the top side is covered partly or entirely by at least one cover mat comprising a glass fibre-based material or a carbon fibre-based material or an aramid-based material, the second end of the carbon fibre mat being sandwiched between the electrically conductive portion of the main body and the at least one cover mat.

4. The spar cap according to claim 1, wherein the electrically conductive portion of the main body comprises a carbon fibre-based compound material comprising at least one unidirectional carbon fibre layer, wherein the carbon fibres of the unidirectional carbon fibre layer are oriented along a length axis of the spar cap.

5. The spar cap according to claim 4, wherein the carbon fibre-based compound material comprises several unidirectional carbon fibre layers and one or more layers of a biaxial carbon fibre material, further wherein the unidirectional carbon fibre layers or stacks of layers and the biaxial carbon fibre layer or the biaxial carbon fibre layers are alternately stacked.

6. The spar cap according to claim 1, wherein the main body comprises at least one core wedge comprising balsa wood and/or plywood and/or a foamed polymer material, with a rectangular cross-section or trapezoid cross-section or polygonal cross-section abutting the electrically conductive portion of the spar cap.

7. A wind turbine blade comprising at least one spar cap according to claim 1.

8. The wind turbine blade according to claim 7, wherein the wind turbine blade comprises at least one down conductor, which is connected to the terminal portion of the at least one metal conductor of the at least one spar cap by at least one connection element, which is oriented chord-wise and/or oriented perpendicular to the terminal portion and/or U-shaped.

9. The wind turbine blade according to claim 8, wherein the at least one down conductor is arranged on a web structure of the wind turbine blade, the web structure being arranged in an internal cavity of the wind turbine blade, further wherein the terminal portions of the one or more metal conductors of the at least one spar cap are extending into the internal cavity.

10. The wind turbine blade according to claim 9, wherein an inner shell of the wind turbine blade is arranged between the at least one spar cap and the web structure, the inner shell comprises one or more openings, through which the terminal portion of the one or more metal conductors extend into the internal cavity.

11. A method for fabricating a wind turbine blade, comprising the following steps:
    providing at least one spar cap according to claim 1;
    arranging one or more panels of the wind turbine blade, so that the one or more panels abut each at least one spar cap;
    arranging a web structure, which supports a down conductor of the wind turbine blade, and/or an inner shell of the wind turbine blade and/or an outer shell of the wind turbine blade; and
    connecting a terminal portion of each of the one or more metal conductors to the down conductor by at least one connection element, which is oriented chord-wise and/or oriented perpendicular to the terminal portion and/or U-shaped.

12. A method for fabricating a spar cap for a wind turbine blade, the method comprising:
    providing an electrically conductive portion of a main body of the spar cap made of one or more carbon fibre-based layers, at least one core wedge of the spar cap main body comprising a rectangular cross-section or a trapezoidal cross-section or a polygonal cross-section, and at least one metal conductor;
    forming the main body of the spar cap by arranging the at least one core wedge so that the at least one core wedge abuts the electrically conductive portion of the main body;
    wrapping a first end of an electrically conductive and stripe-shaped carbon fibre mat around a connection portion of the at least one metal conductor; and
    arranging the at least one metal conductor and the carbon fibre mat, so that a second end of the carbon fibre mat abuts at least partly on the electrically conductive portion of the main body.

13. The method according to claim 12, wherein the at least one metal conductor is used, which is a braided cable or a metal stripe, and comprises a rectangular or substantially rectangular cross-section, further wherein an entire cross-section of the connection portion is wrapped at least by one layer of the carbon fibre mat.

14. The method according to claim 12, wherein one or more cover mats comprising a glass fibre-based material or a carbon fibre-based material or an aramid-based material are used for covering a top side of the main body or the top side and a bottom side of the main body, further wherein the second end of the carbon fibre-based mat is sandwiched between the electrically conductive portion of the main body and the at least one cover mat.

15. The method according to claim 12, wherein the electrically conductive portion of the main body is used, which comprises a carbon fibre-based compound material comprising at least one unidirectional carbon fibre layer, further wherein the carbon fibres of the unidirectional carbon fibre layer are oriented along a length axis of the spar cap.

* * * * *